(12) United States Patent
Connor et al.

(10) Patent No.: US 11,568,893 B2
(45) Date of Patent: Jan. 31, 2023

(54) IMAGE ACQUISITION SYSTEM AND METHOD

(71) Applicant: Sony Interactive Entertainment Inc., Tokyo (JP)

(72) Inventors: Patrick John Connor, London (GB); Timothy Bradley, London (GB); Andrew William Walker, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/877,619

(22) Filed: May 19, 2020

(65) Prior Publication Data

US 2020/0372933 A1 Nov. 26, 2020

(30) Foreign Application Priority Data

May 24, 2019 (GB) ...................................... 1907329

(51) Int. Cl.
*G11B 20/10* (2006.01)
*G11B 27/30* (2006.01)

(52) U.S. Cl.
CPC ........ *G11B 20/10527* (2013.01); *G11B 27/30* (2013.01); *G11B 2020/10592* (2013.01)

(58) Field of Classification Search
CPC .............. G11B 20/10527; G11B 27/30; G11B 2020/10592
See application file for complete search history.

(56) References Cited

U.S. PATENT DOCUMENTS

| | | | |
|---|---|---|---|
| 8,499,038 B1 * | 7/2013 | Vucurevich | G06Q 10/06 709/204 |
| 11,107,177 B1 * | 8/2021 | Ashley | G06F 3/04847 |
| 2011/0052137 A1 * | 3/2011 | Cowie | H04N 5/77 386/207 |
| 2011/0109726 A1 | 5/2011 | Hwang | |
| 2012/0188344 A1 * | 7/2012 | Imai | H04N 13/271 348/47 |
| 2015/0312528 A1 | 10/2015 | Vucurevich | |

(Continued)

FOREIGN PATENT DOCUMENTS

| | | |
|---|---|---|
| CZ | 32686 U1 * | 3/2019 |
| CZ | 32686 U1 | 3/2019 |

(Continued)

OTHER PUBLICATIONS

Extended European Search Report for corresponding EP Application No. 20171766.7, 16 pages, dated Jan. 18, 2021.

(Continued)

*Primary Examiner* — Girumsew Wendmagegn
(74) *Attorney, Agent, or Firm* — Matthew B. Dernier, Esq.

(57) ABSTRACT

A method of capturing free viewpoint content at a location includes recording video on each of a plurality of portable video recording devices at the location; each portable video recording device detecting a wireless synchronisation signal transmitted at the location; and each portable video recording device periodically adding a timestamp to its respective recorded video; where the timestamp is responsive to the detected wireless synchronisation signal, thereby enabling synchronisation of a plurality of recorded videos responsive to the timestamps.

15 Claims, 7 Drawing Sheets

(56) References Cited

U.S. PATENT DOCUMENTS

| | | |
|---|---|---|
| 2016/0156842 A1 | 6/2016 | Benedict |
| 2017/0019525 A1 | 1/2017 | Hannon |
| 2017/0053674 A1 | 2/2017 | Fisher |
| 2017/0272600 A1* | 9/2017 | Ayalasomayajula ... H04N 5/247 |
| 2017/0324888 A1* | 11/2017 | Boone ................. G11B 27/105 |

FOREIGN PATENT DOCUMENTS

| | | |
|---|---|---|
| EP | 2306713 A2 | 4/2011 |
| WO | 1996025710 A1 | 8/1996 |

OTHER PUBLICATIONS

Lydon Darragh "Development and Field Testing of a Time-Synchronized System for Multi-Point Displacement Calculation Using Low-Cost Wireless Vision-Based Sensors" IEEE Sensors Journal, vol. 18, No. 23, pp. 9744-9754, Dec. 1, 2018.

Robrecht Haesevoets "Architecture-Centric Support for Adaptive Service Collaborations" ACM Trans. Softw. Eng. Methodol. V, N, Article A, 42 pages, URL:https://arxiv.org/pdf/1901.03450.pdf, Feb. 1, 2014.

Examination Report for corresponding GB Application No. GB1907329.5, 4 pages, dated Aug. 28, 2020.

Communication Pursuant to Article 94(3) for corresponding EP Application No. 20171766.7, 4 pages, dated Jul. 6, 2022.

Combined Search and Examination Report for corresponding GB Application No. GB1907329.5, 5 pages, dated Nov. 15, 2019.

Y Furukawa, et al., "Multi-View Stereo: A Tutorial" Foundations and Trends in Computer Graphics and Vision, Now Publishers Inc., vol. 9, No. 1-2, 40 pages, (Jan. 2013).

\* cited by examiner

IMAGE ACQUISITION SYSTEM AND METHOD

BACKGROUND OF THE INVENTION

Field of the Invention

The present invention relates to an image acquisition system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, driven at least in part by the improvements made in display technology, there has been an increase in the demand for interactive content that is able to offer an immersive experience to a user. For example, the increase in the number and quality of virtual reality (VR) and augmented reality (AR) devices lends itself to the provision of immersive experiences, while the development of televisions and other display devices that offer increased resolution, refresh rate, and colour reproduction (for example) also act as increasingly suitable devices for the provision of such content. In addition to this, advances in computing and graphics technology have contributed to the increase in suitable content that may be made available.

While video games may be provided that can offer such an experience, the approaches taken to provide viewer immersion in video games may not be applicable to captured video content such as movies or sports events. For example, when generating video game content it is common that the locations and properties of all objects in the environment are known and other features, such as lighting information, are also able to be calculated. Such information is often not available for captured video content, and therefore techniques applicable to video games to enable the provision of more immersive content are not considered to be widely applicable.

One example of captured video content that is adapted for increased immersion of a user is that of three-dimensional video. Consumer devices are available that are operable to display content that may be viewed (often aided by a corresponding set of glasses that are configured to enable the viewing of three-dimensional content) in a manner that causes the user to perceive the content as having significant depth despite the use of a two-dimensional display.

However, one drawback with such systems is that the viewpoint that is adopted by the user is often pre-defined (such as tied to the camera position in a movie) or severely limited (such as allowing a user to switch between a number of such pre-defined viewpoints).

This may serve to reduce the level of immersion that is experienced by the user when viewing the content, particularly in a VR context, as despite appearing three-dimensional there is no corresponding motion of the viewpoint as the user moves their head, as would be expected were the user to move their head when viewing real-world content. The resulting disconnect between the viewpoint and the user's motion can lead to a sense of discomfort for the user, in addition to the loss of immersion.

Similarly, the restrictions placed upon the viewpoint location may be made more noticeable when a user is provided with more immersive content, as the user may be more inclined to try and explore the displayed environment. This can lead to the user attempting to relocate the viewpoint to a desired location in the virtual environment, and becoming frustrated when such a relocation is not possible within the constraints of the provided content. Examples of such changes in viewpoints include a user moving their head in a VR system in order to look around an environment, or an input using a controller or the like in a two-dimensional display arrangement.

It is in view of the above considerations that so-called free viewpoint systems have been developed. The object of such systems is to provide content which a user is able to navigate freely, such that a viewpoint may be selected freely (or at least substantially so) within a virtual environment and a corresponding view is able to be provided to a user. This can enable a user to navigate between any number of viewpoints within the virtual environment, and/or for multiple users to occupy corresponding preferred viewpoints within the virtual environment. These viewpoints may be distributed about an environment in a discreet fashion, or the changing of viewpoints may be a result of a continuous motion within the environment, or content may incorporate elements of each of these.

A number of challenges exist when seeking to provide high-quality image or video content with a free viewpoint. A number of such problems derive from the limitations of the content capturing systems that are used; for example, it may be difficult to capture sufficient image information due to occlusions, image resolution, and camera calibration or the like. In addition to this, information that may be required to generate additional viewpoints (such as lighting information, depth information, and/or information about occluded objects) may be difficult to derive based upon the captured image information. Similarly, limitations of the image capturing arrangement may lead to noisy data being obtained due to a lack of precision; such data may not be suitable for reproduction.

While a number of the problems associated with these issues can be mitigated by the inclusion of a greater number of cameras (or other sensors), this can be rather impractical in many cases. Similarly, addressing these issues by simply increasing the amount of processing that is applied can also be problematic, particularly when live content is being provided, as it may introduce an undesirable latency or require excessive computing power. It is therefore considered that alternative modifications to the free viewpoint content generating may be advantageous.

It is in the context of the above problems that the present disclosure arises, and in particular in the context of the inclusion of a greater number of cameras.

SUMMARY OF THE INVENTION

In a first aspect, a method of capturing free viewpoint content at a location is provided in accordance with claim 1.

In another aspect, a portable video recording device is provided in accordance with claim 12.

Further respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A number of different approaches for implementing free viewpoint content are considered to be suitable, including photogrammetric, light field/multiscopic, and volumetric approaches. Of course, a number of other approaches (or combinations of the above) may be considered.

The first of these approaches comprises the manipulation of captured images in order to appear three-dimensional; this can add freedom to the viewpoint by enabling the user to peer 'around' an object in the image—this can often be rather limited in scope, but is suitable for a number of purposes. Reprojection of the captured image is often used in methods following this approach, enabling the simulation of the 'correct' view (that is, a view that appears to be from the correct position).

The second approach relies on the capturing of a number of images of the environment from different locations. A free viewpoint experience may then be provided to the user by using interpolation between the captured images; the user is able to manipulate the viewpoint freely within the bounds of the image capture area (that is, the area or volume bounded by the image capture devices).

The third approach that is considered, which is the approach in the context of which the present application is provided, comprises the generation of a virtual scene representing the imaged volume in the content capture process. This may include identifying the geometry of the volume and the objects within it, as well as determining any other parameters (such as lighting effects) as appropriate. Such an approach is discussed in 'Multi-View Stereo: A Tutorial' (Y Furukawa, C Hernandez, Foundations and Trends in Computer Graphics and Vision, Vol 9, No. 1-2, 2013), the contents of which are incorporated by reference.

While the present application is framed within the context of the volumetric approach to free viewpoint content, it is considered that the techniques discussed within may be applicable to one or more other approaches.

Figure 1:
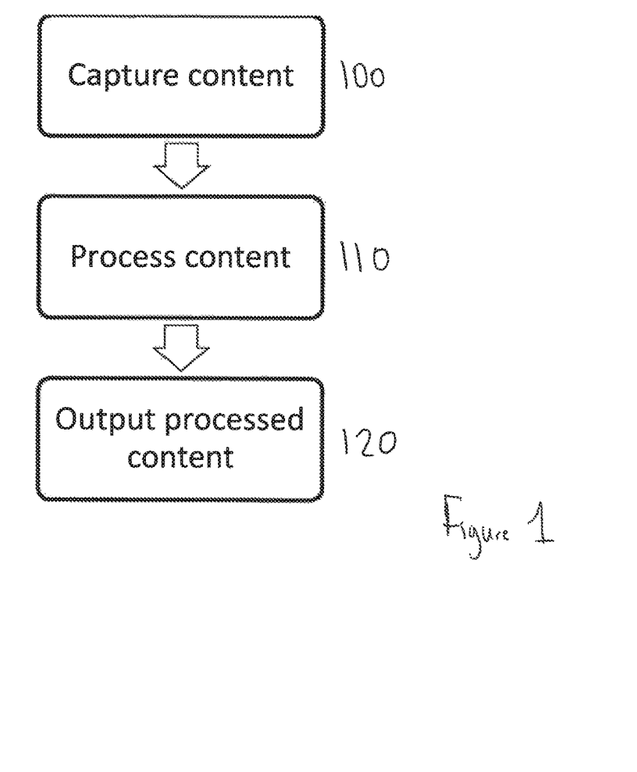
FIG. 1 schematically illustrates a free viewpoint generation and output method.

Referring now to the drawings, wherein like reference numerals designate identical or corresponding parts throughout the several views, FIG. 1 schematically illustrates a method for capturing and generating free viewpoint content, in line with the third approach described above.

A step 100 comprises capturing the content. The content capturing process includes the use of image sensors, such as cameras, and may further include the use of microphones or the like for capturing audio. While in some cases the captured image content may be entirely two-dimensional, in other cases the content capturing process includes the capturing of depth information for a scene—this can be achieved using stereoscopic or depth cameras, for example, or any other method for determining the distance to an object in the capture environment. Examples of content capturing arrangements are described below with reference to FIGS. 2 and 3.

A step 110 comprises performing processing on the captured content, with the aim of generating content that a user is able to use to explore the captured environment with the aid of a free viewpoint. Examples of processing include the estimating of the depth of objects within the captured images, and the encoding of the processed data into a suitable format for storage and/or output to a viewer. Each of these is discussed below with reference to FIG. 5.

The processed data comprises a three-dimensional representation of the environment for which the content capture is performed (or is sufficiently complete so as to enable the generation of such a representation).

This representation may be able to be distributed to a user to enable them to generate free viewpoint experiences locally, or it may be able to be used (for example, at a server) to generate image frames in accordance with a viewpoint defined by a client device, or in a hybrid embodiment to supply a subset of the data pertaining to that viewpoint to the user (client) to enable them to generate a viewpoint locally; in this latter case, a subset of data for the current viewpoint and a penumbra of nearby views (e.g. 10° lateral movement in any direction) may be provided to enable local free viewpoint rendering, for example with successive data subsets being transferred as needed.

A step 120 comprises the output of the free viewpoint content to a viewer. This may be performed in a number of different ways; for example, the viewer may request a particular viewpoint from a server which holds the encoded data. The server may then generate images representing the viewpoint at the requested position, and transmit this to the viewer. In some embodiments, the viewer may instead be provided with encoded data for the whole (or at least a part of) the captured environment such that processing for generating image content is performed locally.

Figure 2:
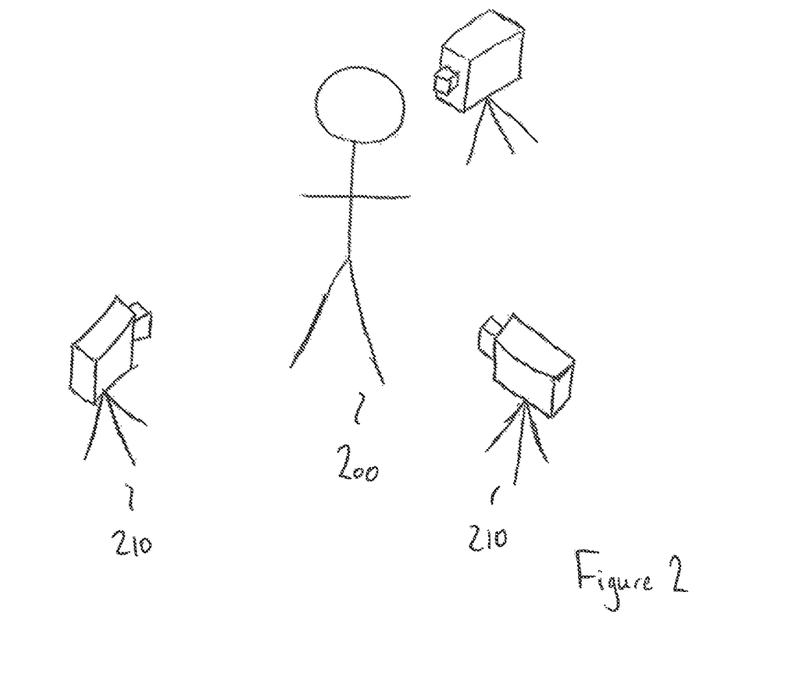
FIG. 2 schematically illustrates a content capture arrangement.

FIG. 2 schematically illustrates a content capture arrangement that may be used to implement step 100 as described with reference to FIG. 1.

In this Figure, a plurality of cameras 210 are arranged so as to capture images of a person 200 (such as an actor in a movie) from a range of different angles. The cameras 210 may also be configured to capture audio in the environment, although this may instead be captured separately. In some embodiments it is advantageous to be able to synchronise the cameras or establish the timing offset between their image capture—this may assist with generating a high-quality output for a user.

Between them, the cameras 210 may be arranged so as to be able to capture images of a significant proportion of the environment and objects within the environment. In an ideal scenario every part of every surface within the environment is imaged by the arrangement of cameras, although in practice this is rarely possible due to factors such as occlusions by other objects in the environment. Such an issue may be addressed in a number of manners, a selection of which is discussed below.

For example, the arrangement of cameras 210 as shown in FIG. 2 may be suitable for capturing images of the user from a number of angles—but the side of the person 200 facing away from the cameras may not be well-imaged, leading to a lack of information for this area. A number of techniques may be used to mitigate this problem, some of which will be discussed below.

Figure 3:
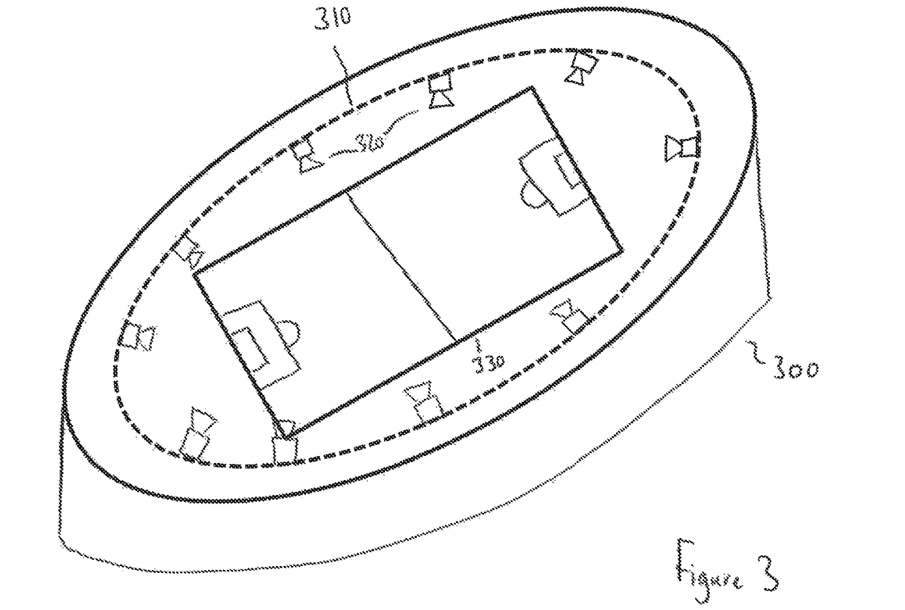
FIG. 3 schematically illustrates an alternative content capture arrangement.

FIG. 3 schematically illustrates an alternative content capture arrangement that may be used to implement step 100 as described with reference to FIG. 1. As is apparent from FIG. 3, this is a configuration that may be more suited for the capturing of large-scale events, such as sports matches, rather than individual people—although of course such an arrangement could be scaled down to an environment smaller than a sports stadium as appropriate.

FIG. 3 comprises a stadium 300 which has a fixture 310 that substantially follows the shape of the stadium 300. A plurality of cameras 320 are supplied on this fixture 310, and may be angled so as to capture images of events within the stadium 300; this may include the action on the pitch 330, the sidelines, or even the crowd. The number of cameras, and the properties of each camera, may be selected freely in order to provide a suitable degree of optical coverage of the environment. For example, a set of 40 cameras each with 4K resolution and arranged so as to be able to collectively image the whole pitch 330 may be provided.

Figure 4A:
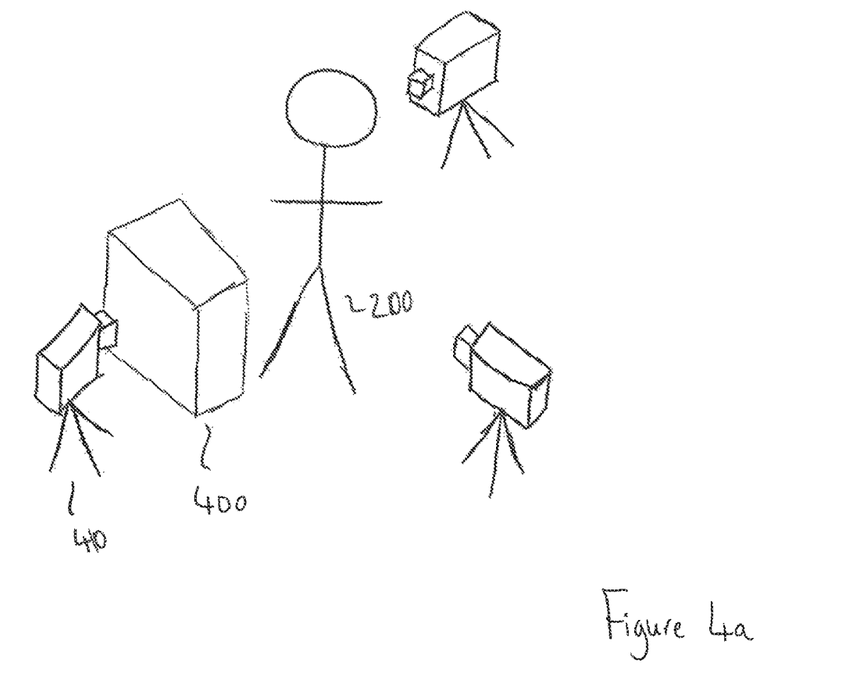
FIGS. 4a and 4b schematically illustrate an occluded content capture arrangement.
Figure 4B:
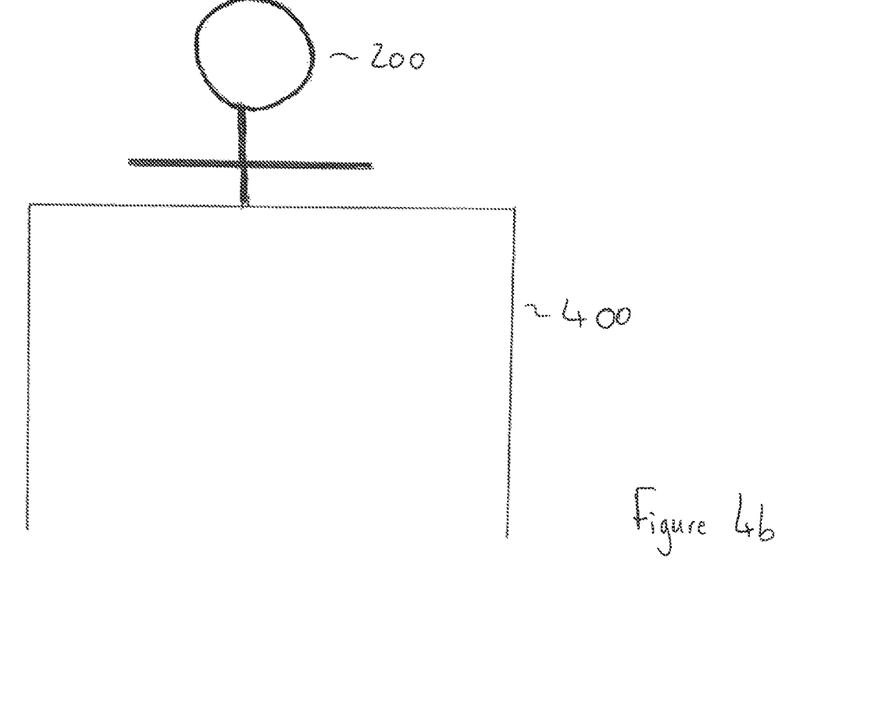

FIGS. 4a and 4b schematically illustrate an occlusion problem that may arise when capturing content in line with step 100 of FIG. 1.

FIG. 4a schematically illustrates an occluded content capture arrangement; this is the content capture arrangement of FIG. 2, with an additional object 400 in the capture environment that prevent the camera 410 from correctly imaging the person 200. Of course, while shown as an inanimate object the object 400 could be anything that blocks the camera's view—such as other people, cameras, or even inclement weather.

FIG. 4b schematically illustrates a viewpoint from the camera 410 of FIG. 4a. It is apparent from this Figure that the camera is no longer able to capture images of the lower half of the person's 200 body due to the occlusion by the object 400. This may lead to incomplete information about this area of the environment, which can cause problems in a free viewpoint arrangement—if a user moves the viewpoint to the other side of the object 400 there would not be sufficient information to generate a view of the person 200.

In some cases, the camera system for capturing images of the environment may be robust to such occlusions—for example, given enough cameras it is possible that the arrangement leads to every part of the environment (or at least a sufficient number of parts of the environment) being imaged by more than one camera. In such a case, it is possible that images of an area occluded from one camera's view are captured by another camera.

Alternatively, or in addition, a number of processing techniques may be used to fill such gaps. For instance, information about that area (such as the colour of the trousers worn by the person 200) may be stored from previously captured frames, or determined in dependence upon other information—for example, it may be assumed that the colour is constant (either over time, spatially, or both), and so any image of the trousers may be enough to supply the colour information despite being captured at a different time, and/or imaging a different portion of the trousers. Similarly, the colour could be input by an operator or the like.

Figure 5:
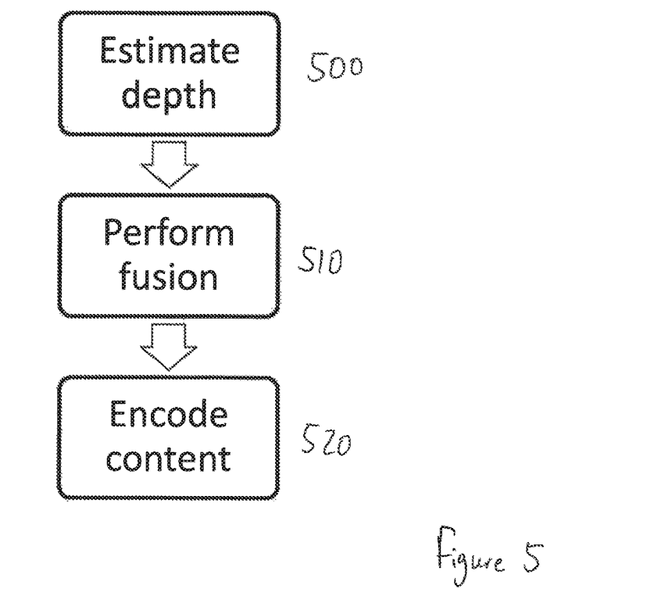
FIG. 5 schematically illustrates a content processing method.

FIG. 5 schematically illustrates a content processing method, which may be implemented as an example of the processing performed in step 110 of FIG. 1. Of course, any suitable processing may be performed in the step 110; it is not limited to that shown in FIG. 5, nor must every step of FIG. 5 be performed.

A step 500 comprises an estimation of the depth of one or more parts of the environment that is imaged. In some cases, this may be performed by identifying the disparity associated with an object between a pair of stereoscopic images; in other cases, monoscopic depth detection may be performed, or a position may be estimated from a number of images based upon knowledge about the position and orientation of the cameras used to capture those images.

A step 510 comprises the fusion of image data. Fusion of image data is the process of combining the information that is obtainable from each of a plurality of images in order to generate a three-dimensional space using images in a two-dimensional space. For example, image data may be fused so as to generate a three-dimensional model of an object that comprises two-dimensional information about each side of the object, as imaged by a corresponding plurality of cameras. This is discussed below in more detail, with reference to FIGS. 6 and 7.

A step 520 comprises the encoding of the processed image data, for example to generate data that is in a format that is suitable for storage and/or transmission to a user. Examples of suitable representations of the content include the use of point clouds and/or meshes to represent objects and features in the environment. For instance, a point cloud may be defined that describes the location of points on the surface of each of a number of objects/environmental features. When rendering an image, a viewpoint within the virtual environment may be defined and the point cloud is consulted to determine which objects (points) fall within the viewing frustum—once this is determined, corresponding texture information may be applied to generate a view within the virtual environment.

Further processing may also be performed in addition to, or instead of, one or more of the steps shown in FIG. 5. For example, segmentation may be performed so as to determine which elements of a captured image correspond to distinct objects and which elements form the background. Hole-filling or completion processing may also be performed, which is processing that seeks to identify where information about the environment is missing and to approximate information that may be desired, but is not present in the captured information.

As discussed with reference to step 510, fusion of image data may be performed in order to generate a more complete description of the environment in which image capture is performed. For example, image data from a second camera may be used to supplement the image data from a first camera, which can mitigate the problem of occlusion.

In general, fusion techniques utilise a number of captured images that each capture an image (a two-dimensional image and depth information) of the environment, the images being captured at different times or from different camera positions. These images are then processed to extract information to enable a three-dimensional reconstruction. An example of such a process is discussed below.

At a first stage, segmentation is performed. This process results in a separation of an imaged object and a background of the image from one another, such that the background may be removed from the image. The segmented image of the object, in conjunction with the depth data that is captured, can then be used to generate a three-dimensional image of the object from one side, where every pixel of the image represents a point in three-dimensional space.

By generating multiple such images from a number of viewpoints, three-dimensional images may be generated for an object from a number of different sides; this can enable the construction of a full three-dimensional volume representing the external shape of the object. The fusion process here is used to correlate matching points as captured by the different cameras, and to remove any erroneous points, so as to enable a combination of the captured three-dimensional images into a three-dimensional representation.

Figure 6:
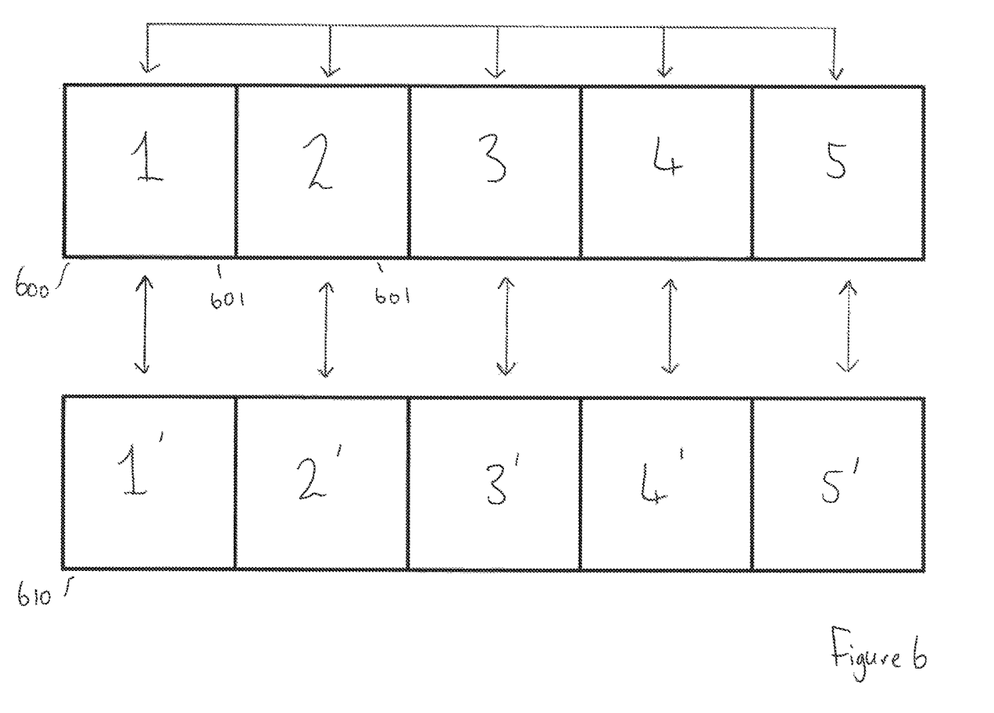
FIG. 6 schematically illustrates image fusion schemes.

FIG. 6 schematically illustrates examples of such fusion. A first image data set 600 and a second image data set 610 are shown, which correspond respectively to image data captured by a first and a second camera. Each of the image data sets comprises a number of consecutive frames 601.

Temporal fusion is a fusion technique that may be performed within a single image data set (that is, an image data set captured by a single camera over a time duration). In FIG. 6, this is shown with respect to the image data set 600, wherein information from the frames 601 (labeled 1-5) may each be used to supplement data from the other frames. Temporal fusion may be advantageous when there is motion of objects within the environment; occlusions may vary between the image frames captured by a single camera, and therefore image data from earlier- or later-captured frames may be suitable to fill gaps (such as those due to occlusion) in the data for a given image frame.

Spatial fusion may be performed between the two image data sets 601 and 610 (that is, image data sets captured by cameras located at different viewpoints); for example, image data from the frame labeled 1' may be used to supplement the image data derived from the frame labeled 1. This may be performed for any pairing of image frames, rather than necessarily being limited to those captured at (at least substantially) the same time. Spatial fusion is advantageous in that the image data from each of the image data sets is obtained from a different position—different views of the same object may therefore be captured.

Figure 7:
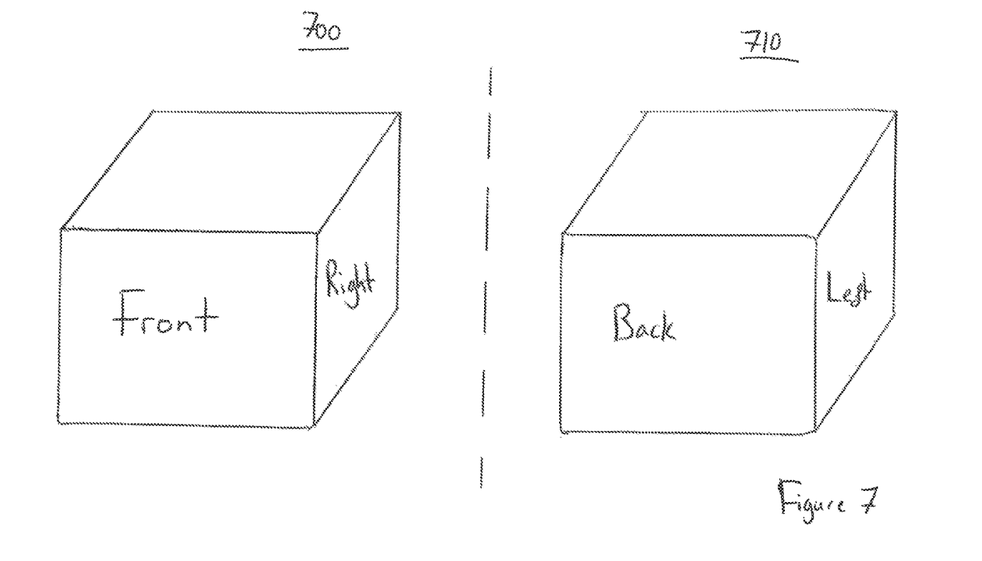
FIG. 7 schematically illustrates image frames for performing image fusion.

FIG. 7 schematically illustrates an example of two image frames 601, each imaging the same object. In the first, labeled 700, the front, top, and right portions of the object can be seen by an image capture device. In the context of FIG. 6, the image 700 may correspond to the image frame labeled 1 in the image data set 600.

In the second, labeled 710, the back, left, and top portions of the object can be seen by an image capture device. In the context of FIG. 6, the image 710 may correspond to the image frame labeled 1' in the image data set 610. This view would therefore represent a view of the object as captured by a different image capture device that is provided at a different location. Alternatively, the image 710 may correspond to the image frame labeled 5 in the image data set 600. This view would therefore represent a view of the object as captured by the same image capture device but at a later time, this time difference being sufficiently long that the object has rotated (or the camera has moved).

In either case, the data from each of the images 700 and 710 may be combined so as to generate a more complete description of the imaged object than would be available using only a single image frame comprising the object. Of course, any suitable combination of spatial and temporal fusion may be used as appropriate—the fusion process should not be limited to the specific examples provided above.

It should be appreciated that the segmentation-based approach used in the example above is non-limiting; other methods may be suitable. For example, a truncated signed distance function (TSDF) may be used to represent a scene volumetrically, with this representation being used for integrating multiple images of the scene captured from different viewpoints.

At the conclusion of the method described with reference to FIG. 5 (or an equivalent processing of the captured data), it is anticipated that the captured content has been converted into a form that enables the generation of a viewpoint at any (or at least at a substantial number of) locations within the captured environment.

Figure 8:
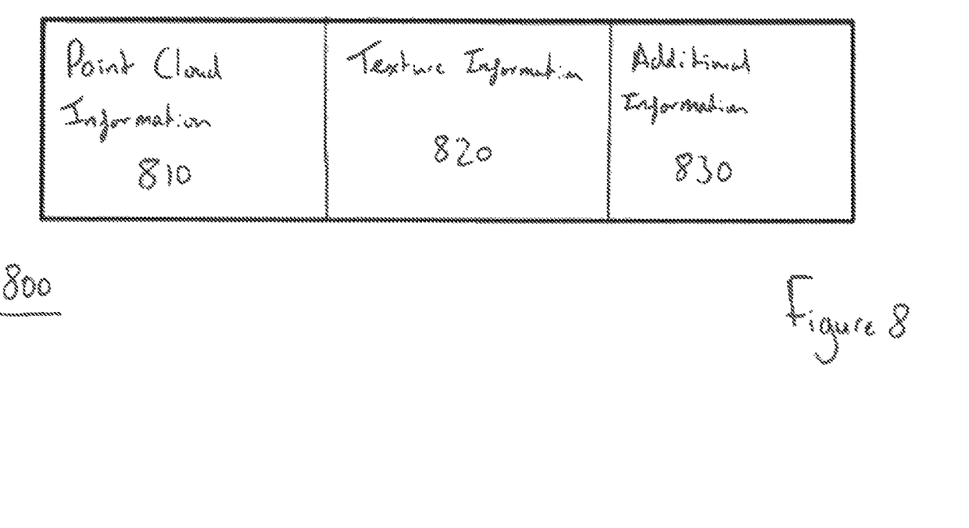
FIG. 8 schematically illustrates a data structure.

FIG. 8 schematically illustrates an exemplary data structure for the storage of the generated content; the stored generated content may be referred to as free viewpoint data. In this data format, a file 800 comprises point cloud information 810, texture information 820, and additional information 830. Of course, an alternative data structure may be provided, as is appropriate for the format of the generated content.

The point cloud information 810 may comprise sufficient data to enable to reproduction of the entire virtual environment, or at least a portion of that environment. For example, a different set of point cloud information 810 may instead be generated for each of a plurality of areas within the virtual environment—such as on a per-room basis.

The texture information 820 complements the point cloud information 810, such that textures are provided that correspond to each of the surfaces that are able to be described using the point cloud information 810. As noted above, the texture information is applied to the geometry described by the point cloud within a viewing region (defined by the viewpoint within the virtual environment) as a part of the rendering process. The textures can be stored in any suitable image format, for example.

The additional information 830 may comprise identifying information for the data structure (such as identifying the virtual environment that is represented by the included data). Alternatively, or in addition, information assisting with the reproduction of a virtual viewpoint within the virtual environment described by the point cloud information 810 may be provided; examples include lighting information for the environment. Any other suitable information may also be included as appropriate, such as object identification information or sound source information for the virtual environment.

As noted above, this information may be provided to the user in a raw form including data (such as a point cloud representation of the environment, in addition to texture and lighting information) for the whole of the environment. However, this represents a significant amount of data to transmit and store (point clouds may comprise millions or even billions of data points) and may therefore be inappropriate in a number of scenarios.

As an alternative, this information may be provided to a viewer by generating an image at a server in response to an input viewpoint position/orientation. While this may introduce an increased degree of input latency, it may be responsive enough to provide a suitable free viewpoint experience to a user.

In either case, rendering of a viewpoint must be performed based upon the encoded data. For example, when using a point cloud representation to store information about the captured environment the rendering process comprises a surface reconstruction process as a part of generating an image for display. This is performed so as to enable to generation of surfaces from a set of discrete points in the point cloud.

Figure 9:
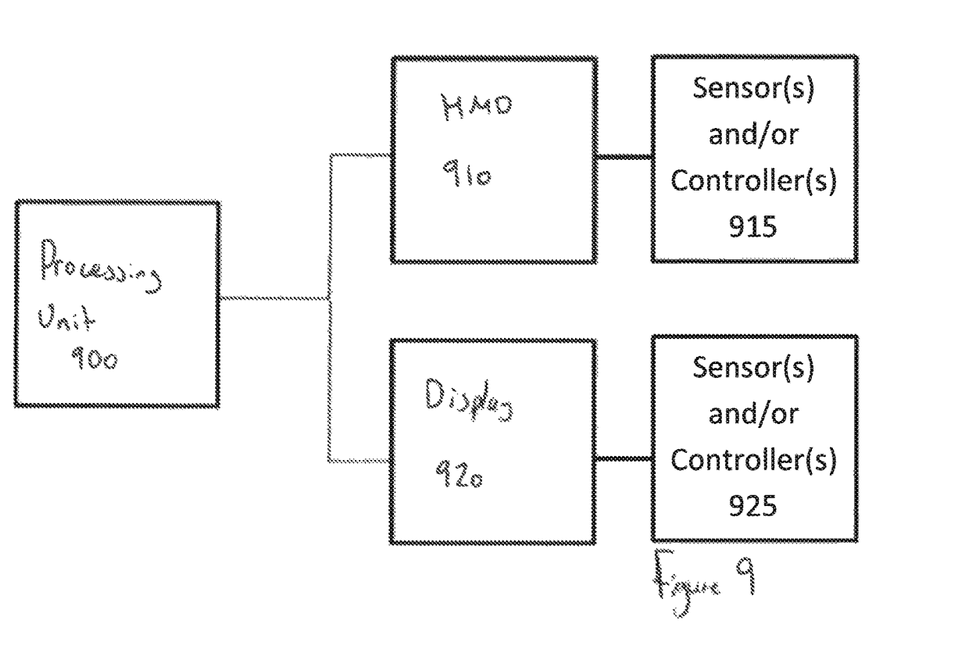
FIG. 9 schematically illustrates a content generation and display system.

FIG. 9 schematically illustrates a content generation and reproduction system. This system includes a processing unit 900, an HMD 910, and a display 920.

Figure 10:
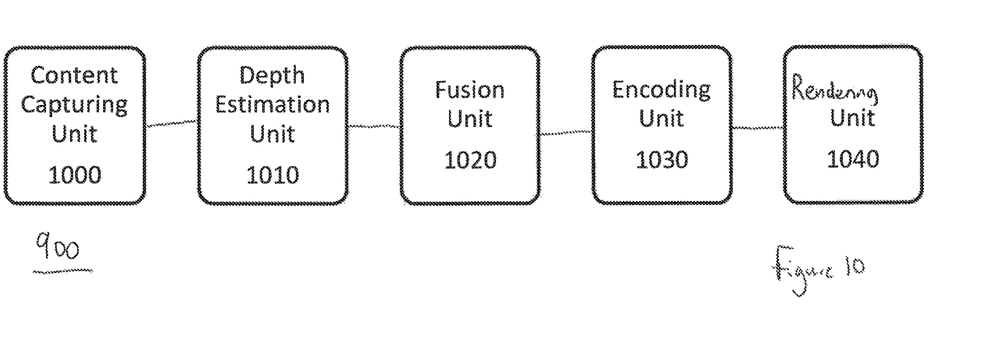
FIG. 10 schematically illustrates a processing unit.

The processing unit 900 is operable to generate content (for example, by using the method discussed with reference to FIG. 1), and to render a desired viewpoint for display to each of one or more users within the generated content. An exemplary arrangement of units within the processing unit 900 is shown in FIG. 10 and discussed below.

The desired viewpoint may be determined in any of a number of ways; for example, the HMD 910 may be associated with one or more position and/or orientation sensors 915 that enable the user's head motion (or any other suitable motion) to be used as an input to control the motion of the desired viewpoint. Alternatively, or in addition, the viewpoint may be controlled via inputs to a controller 915. Similarly, inputs to control the viewpoint may be provided via a control pad (such as a game controller) that is associated with one or more of the displays 910 (via the controller 915) and 920 (via the controller 925) and/or the processing unit 900.

In any case, the viewpoint may be controlled in a three-dimensional manner such that the user can move the viewpoint freely (or at least substantially freely) within the virtual environment, as well as modify the orientation of the viewpoint within the virtual environment defined by the free viewpoint data.

The HMD 910 and display 920 (such as a television, mobile phone or computer monitor) are operable to display content rendered by the processing unit 900. Each of these may be used independently, such that the other device does not display content at all, or in combination; for example, the displays may show the same content (with one of the display devices acting as a spectator screen, for example) or may show different viewpoints within the same virtual environment. Of course, the number of displays (head-mountable or otherwise) may be selected freely, rather than being limited to one of each type of display.

FIG. 10 schematically illustrates the processing unit 900, as described above with reference to FIG. 9. The processing unit 900 comprises a content capturing unit 1000, a depth estimation unit 1010, a fusion unit 1020, an encoding unit 1030, and a rendering unit 1040.

The content capturing unit 1000 is operable to control the content capture process; for example, this may comprise the control of one or more imaging units and/or audio capture units to generate information about a real environment. Such a process is described above with reference to step 100 of FIG. 1.

The depth estimation unit 1010 is operable to perform a process to generate estimates of the depth of one or more parts of the environment of which images are captured. This may comprise the use of any suitable depth estimation technique, and may use information about the locations of the content capturing devices. For example, this may comprise identifying the disparity between stereoscopic image pairs for an imaged feature. A depth estimation process is described above with reference to step 500 of FIG. 5.

The fusion unit 1020 is operable to perform an image fusion process so as to enable the generation of a coherent virtual representation of the real environment. This may include the generation of three-dimensional representations of imaged objects/features within the real environment. A fusion process is described above with reference to step 510 of FIG. 5.

The encoding unit 1030 is operable to generate data that is in a format that is suitable for the generation of images for display to a user, where those images may be generated for any viewpoint within the virtual environment. In some embodiments, the selected encoding method may be selected in dependence upon the desired transmission/storage methods. For example, if the encoded content is to be transmitted (such as to a separate rendering device via a network) the encoding method may be selected so as to either increase compression or reduce individual file size (such that files can be sent on an as-required basis). A content encoding process is described above with reference to step 520 of FIG. 5.

The rendering unit 1040 is operable to render images of the virtual environment for output to one or more displays (such as the HMD 910 and/or display 920 of FIG. 9). For example, the rendering process may comprise receiving a desired viewpoint (which may be determined based upon user inputs), identifying the regions of the point cloud that appear within the frustum defined by the desired viewpoint, and applying the corresponding textures to those point cloud regions.

In some embodiments, the processing unit 900 is instead not operable to generate the content, but is operable only to reproduce the content for display. For example, the content may be generated elsewhere and information (such as in the form of a file as discussed with reference to FIG. 8) may be provided to the processing unit 900 to enable a desired viewpoint to be rendered upon request for output to one or more display devices 910 and 920.

Of course, in some embodiments it is envisaged that the processing unit 900 may simply act as an intermediate device for accessing content from a server and providing it to the one or more displays 910 and 920. For example, rendered content could be provided to the processing device 900 by a server in response to uploaded information about a requested viewpoint; such content may then be transmitted to one or more displays 910 and 920. Similarly, the processing unit 900 may be omitted altogether in embodiments in which the HMD 910 and/or display 920 are able to communicate with the server directly.

Figure 11:
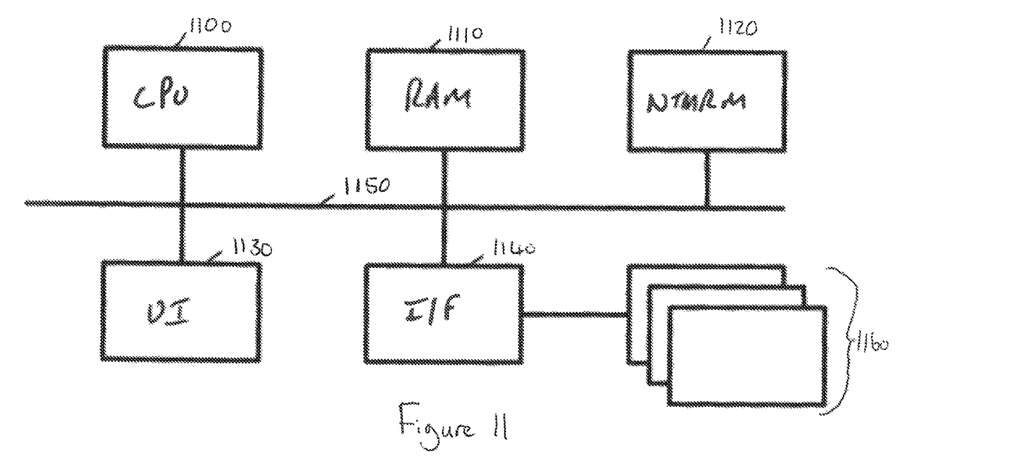
FIG. 11 schematically illustrates a data processing apparatus.

FIG. 11 schematically illustrates a data processing apparatus suitable to carry out the methods discussed herein and in particular to implement one or both of the free viewpoint data generation technique(s) and the image viewing or presentation technique(s) outlined above, comprising a central processing unit or CPU 1100, a random access memory (RAM) 1110, a non-transitory machine-readable memory or medium (NTMRM) 1120 such as a flash memory, a hard disc drive or the like, a user interface such as a display, keyboard, mouse, or the like 1130, and an input/output interface 1140 linked to peripherals 1160 such as a camera, a display and a position and/or orientation and/or motion detector by which a current viewpoint (in a display mode) may be controlled. These components are linked together by a bus structure 1150. The CPU 1100 can perform any of the above methods under the control of program instructions stored in the RAM 1110 and/or the NTMRM1120. The NTMRM 1120 therefore provides an example of a non-transitory machine-readable medium which stores computer software by which the CPU 1100 performs the method or methods discussed above.

Figure 12:
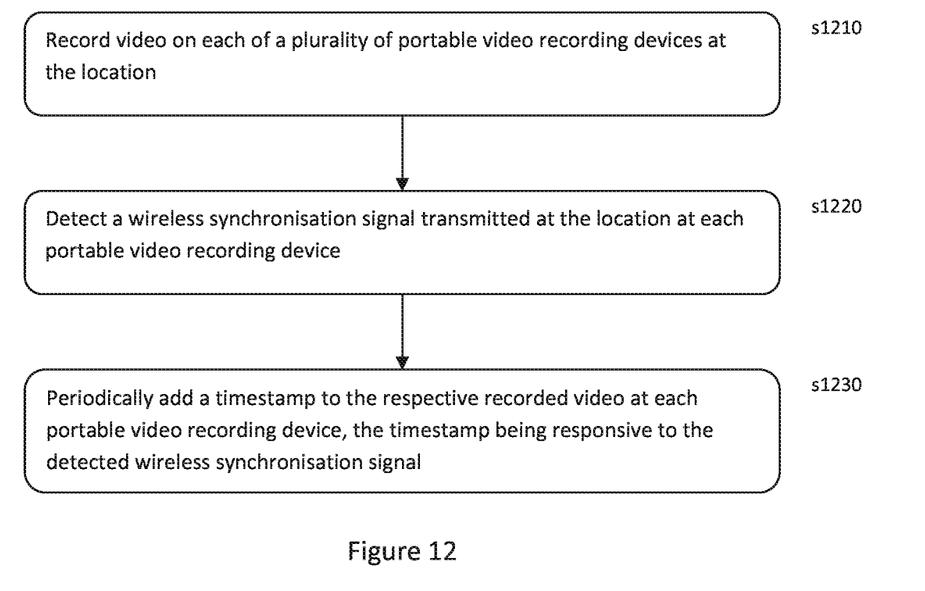
FIG. 12 is a flow chart of a method of capturing free viewpoint content at a location.

In the context of the above explained methods and hardware, and referring now to FIG. 12, in an embodiment of the present invention a method of capturing free viewpoint content at a location is disclosed, for example providing the content capture step 100 of FIG. 1.

In this method of capturing free viewpoint content, a first step s1210 comprises recording video on each of a plurality of portable video recording devices at the location. The location may be for example an enclosed structure of known dimension such as the stadium 300, or similarly a concert venue or the like, or a dedicated or adapted free viewpoint content recording studio, or may be an ad hoc location whose extent is typically defined by the positions of participant portable video recording devices.

In a second step s1220, each portable video recording device detects a wireless synchronisation signal transmitted at the location. As explained later herein, this wireless synchronisation signal is typically provided by a wireless radio service such as Wi-Fi® or Bluetooth®, but alternatively or in addition may be an audible/acoustic signal.

In a third step s1230, each portable video recording device periodically adds a timestamp to its respective recorded video. The timestamp may be at every frame, or particular class of frame (for example I, P or B frame), or per group of pictures or other frame organising structure, depending upon the recording format. Similarly the timestamp may be every N frames, where N frames corresponds to a predetermined timing; hence for example every 25 frames, where 25 frames corresponds to one second.

In step s1230, the timestamps themselves are responsive to the detected wireless synchronisation signal, thereby enabling synchronisation of a plurality of recorded videos obtained from a plurality of portable video recording devices, by reference to synchronised timestamps, thereby providing the multiple viewpoints at the location that are needed by the free viewpoint content techniques described previously herein to generate a free viewpoint representation of at least part of the location.

Hence a timestamp may be added to currently recorded video at a moment having a fixed relationship between receipt of the synchronisation signal and application of the timestamp, such as for example the start of the next acquired video frame after reception of the synchronisation signal. The timestamp itself may then be responsive to a specific property of the transmitted synchronisation signal.

Hence for example the synchronisation signal may simply be a counter, such as a continuous or a looping counter, and the timestamp may incorporate some or all of the most recently received counter value, or a separate value derived from that most recently received counter value, enabling a timestamp from one video recording to be matched to a timestamp from a different video recording and thereby synchronised.

Optionally an internal real-time clock of the video recording device may also be used to further provide an approximate time. This may be used for example to disambiguate counter values in the case of a synchronisation count from a looping counter. Hence if for example the looping counter resets every 10 minutes, then real-time clock information associated with each video recording can be used to determine if a particular counter value refers to the same loop of the counter for two different video recordings, thereby enabling synchronisation.

The skilled person will appreciate that any suitable synchronisation signal may be used, such as an accurate real-time clock signal, a video frame counter signal, or a signal with an arbitrary value sequence, as long as this value sequence it is known when subsequently synchronising videos.

It will also be appreciated that the synchronisation signal may be transmitted at any suitable rate; for example, every second may be sufficient to ensure per frame synchronisation of a plurality of portable video recording devices but alternatively a per frame synchronisation signal may be transmitted, or a synchronisation signal on a different schedule, such as every 10, 30 or 60 seconds.

In an embodiment of the present invention, the wireless synchronisation signal is transmitted by one or infrared transmitters. Advantageously, light from such transmitters cannot be seen by people at the location, whereas infrared detectors are commonplace on portable video recording devices (for example as remote control receivers). In addition, most video detectors (e.g. charge coupled devices) are sensitive to near infrared signals, potentially enabling detection of the synchronisation signal by analysis of the recorded video itself by detection of one or more near infrared light sources in the image.

Notably, if three or more infrared transmitters are placed at respective predetermined positions at the location, the portable video recording device can potentially triangulate its own location.

Even in the case of only two or one infrared transmitter, potentially the portable video recording device can determine its position relative to that infrared transmitter, and in either case, can potentially track its movement and hence position by analysis of the video image (for example using known optical flow techniques), and/or by use of internal sensors such as accelerometers or gyroscopes.

It will be appreciated that such sensors are available on most mobile phones, together with at least one camera and a processor capable of optical flow analysis and/or detection of an infrared transmitter in a captured image. Furthermore, there is a high likelihood of people visiting the location having such mobile phones and thus potentially contributing to the capturing of free viewpoint content at the location.

It will be appreciated that mobile phones often comprise GPS sensors, but these may not be sufficiently accurate (particularly if inside an enclosed venue) to identify exactly where the phone is within the location, and hence this may be supplemented or replaced with the detection of infrared transmitters, and/or optical flow tracking and/or internal accelerometer/gyroscopic tracking as appropriate.

It will also be appreciated that alternatively or in addition location triangulation/tracking maybe achieved using location markers separate to any infrared transmitters, if used; for example fiduciary markers, QR codes, or the like may be used to identify predetermined positions at the location. Consequently optionally in this case any infrared synchronisation signal, if used, may be positioned to enable detection without necessarily being seen directly for the purposes of location detection; for example by being located in the ceiling.

Alternatively or in addition to infrared transmitters, the wireless synchronisation signal may be transmitted by wireless radio service.

Consequently, in an embodiment of the present invention the wireless synchronisation signal is transmitted by a wireless radio service. This is likely to be a free-to-access Wi-Fi® service, or optionally a Wi-Fi® beacon periodically transmitted and including a synchronisation signal; such a beacon can be detected by a mobile phone without explicitly opting to join the Wi-Fi service, making use of the synchronisation signal simpler.

Alternatively or in addition, the wireless radio service may be a Bluetooth® service, or optionally a Bluetooth® beacon periodically transmitted and including a synchronisation signal; again such a beacon can be detected by a mobile phone without explicitly pairing with the transmitting Bluetooth device, making use of the synchronisation signal simpler.

In the case of either the Wi-Fi® and/or Bluetooth® service and/or beacon, such wireless radio services may transmit a dedicated organisation signal, or, particularly in the case of using legacy Wi-Fi® and/or Bluetooth® systems at a location, may already or be optionally enabled to transmit one or more existing signals that can be treated as a synchronisation signal for the purposes of generating a timestamp for video recorded by the plurality of portable video recording devices, if these devices are adapted to make use of such a signal in this manner.

Similarly with regards to the use of legacy Wi-Fi and/or Bluetooth systems at a location, it will also be appreciated that a synchronisation signal could be transmitted as an audio stream. Such an audio stream may use clicks and/or one or more tones to convey a synchronisation signal. Hence for example a short high-pitched tone may repeat with a relatively short periodicity (e.g. each second, or each ½s or ⅓₀ second), whilst a lower pitched tone may repeat with a relatively long periodicity (e.g. every 10, 20, 30 or 60 seconds). The portable video recording device may then synchronise generation of a timestamp to this signal, optionally in conjunction with its own built-in clock, as described previously herein.

It will also be appreciated that other potential sources of wireless radio service include a pico-cell base station or other cellular transmitter that phones at the location connect to, which again may transmit a dedicated synchronisation signal, or again may similarly transmit one or more signals that can be treated as a synchronisation signal for the purposes of generating a timestamp for video recorded by the plurality of phones acting as portable video recording devices, if these devices are adapted to make use of such a signal in this manner.

Alternatively or in addition, one or more of the participant portable video recording devices (e.g. mobile phones) may act as the wireless radio service, and transmit a synchronisation signal, such that subsequently other video recordings are synchronised with respect to it. In this case, in a large location it may be difficult for one phone to cover the whole location, and so other portable video recording devices may detect the synchronisation signal, and if it is below a threshold reception strength, may operate as repeaters; in this way, a mesh of synchronised transmitters may form emergently within the location, with other portable video recording devices not acting as repeaters once a sufficient number of repeaters exist, and repeaters regularly reviewing reception strength of the synchronisation signal to determine whether they are still needed.

Again for the wireless radio service, the synchronisation signal may be a continuous or looped counter, and time stamping and synchronisation strategies may be similar to those discussed previously herein for infrared transmitters.

In principle, synchronisation of a plurality of videos may be performed by looking for corresponding events in different video recordings; however this is likely to be computationally burdensome, particularly given that typically different portable video recording devices will be capturing significantly different viewpoints, which of course is beneficial to the eventual generation of free viewpoint content but makes but for searching for correlated events within the recorded videos difficult.

By contrast, potentially it is more straightforward to identify correlations in audio between different video recordings, as audio (optionally mixed down to mono) is less dependent on the direction of view of the camera, and as a one-dimensional data stream is inherently simpler to analyse.

Accordingly, in an embodiment of the present invention, the wireless synchronisation signal is an audio signal.

Whilst a dedicated audio signal, such as a tone pulse, might be used, typically an audio signal corresponding to a primary ambient source at the location may be used. Hence for example at a concert, the audio output by the loudspeakers may be used as the synchronisation signal. The primary ambient source (for example the loudspeakers) will occupy a predetermined position at the location, and hence the audio signal itself will emanate from that predetermined position.

Synchronisation with reference to this audio signal will therefore require correction as a function of the distance of the portable video recording device from the predetermined position, since sound propagates at approximately 340 m/s; therefore for video recorded at a frame rate of 30 FPS, for example, the audio may go out of sync by one frame for every 10 m distance from the audio signal source. Hence each portable video recording device should correct for audio propagation time from the predetermined position of the source to the respective portable video recording device.

Consequently an approximate distance of the portable video recording device from the audio source may be required. This may be achieved for example by use of infrared transmitters as discussed previously, and/or fiduciary markers within the location, including one substantially co-located with the audio signal source; the portable video recording device may then determine its position relative to the infrared transmitters and/or fiduciary markers.

Hence a portable video recording device may correct for audio propagation time from the predetermined position of the source to the respective portable video recording device based upon analysis of one or more features in the video being recorded by the respective video recording device.

Alternatively or in addition, a GPS receiver of the portable video recording device may be sufficiently accurate to determine distance to within the order of 10 m, and similarly translation with respect to other known signals such as Wi-Fi access points or cellular base stations may be used where possible.

However in some locations GPS and/or other triangulation methods may not be possible, and optical/visible points of reference such as infrared transmitters and fiduciary markers may not be available.

Hence alternatively or in addition, the source audio may be broadcast via a wireless radio service such as Wi-Fi® and/or Bluetooth®, for example as a stream. It will be appreciated that potentially unlike the transmission of a dedicated synchronisation signal, existing/legacy Wi-Fi® and/or Bluetooth® transmitters at the location may be used for audio streaming without further modification.

Reception of the audio stream from the source (for example obtained either from a microphone positioned at the audio source or at a known distance from the source, or taken directly from a signal driving the audio source) will have a known and effectively fixed delay due to encoding and packetisation, and possibly also due to a known audio propagation time between the source and a microphone at a known position.

The audio received by this streaming process may then be compared with audio received by a microphone of the portable video recording device, for example by cross-correlation, to determine the effective offset between them. This offset will be primarily due to the propagation time between the audio source and the portable video recording device. The effective distance of the portable video recording device from the audio source will be the sum of this offset and the fixed delay associated with the streaming process.

A portable video recording device can then correct for audio propagation time from the predetermined position of the source to the respective portable video recording device based upon the wireless signal transmitted by the wireless radio service.

Hence in summary the wireless synchronisation signal may be transmitted by one or more infrared transmitters, or by a wireless radio service provided by one or more Wi-Fi®, Bluetooth® or cellular transmitters, and may comprise a counter or other time-dependent signal such as a system timing signal of one of the radio services or an audio stream comprising timed audio features or an ambient audio source of the location, from which a timestamp can be generated.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 13:
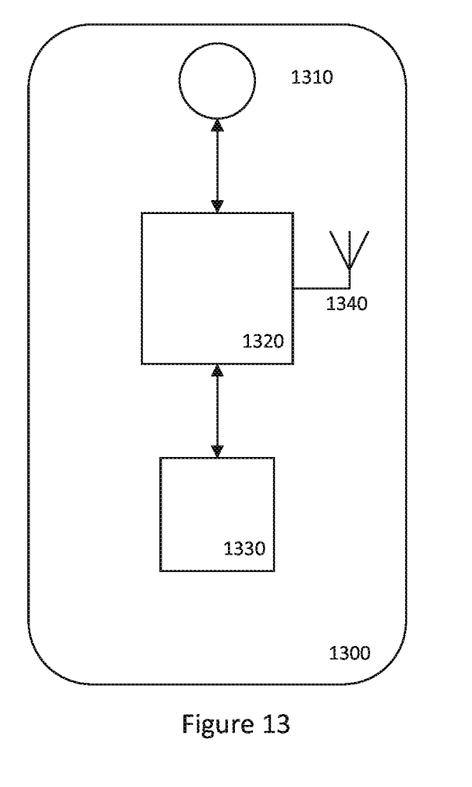
FIG. 13 schematically illustrates a portable video recording device.

Referring now to FIG. 13, a mobile phone 1300 is illustrated as an example of a portable video recording device in accordance with embodiments of the present invention.

The phone comprises a video recording unit, e.g. a camera 1310 for capturing its contribution towards the free viewpoint content at the location occupied by the phone.

This communicates with a processor 1320 operable (for example under suitable software instruction) as a detector to detect a wireless synchronisation signal transmitted at the location. As described previously herein, the detection may comprise periodic analysis of images captured by the camera (for example to detect a synchronisation signal from an infrared transmitter), or detection from an infrared detector (not shown). Alternatively or in addition, the detection may comprise analysis of a signal obtained from wireless radio service via an antenna 1340.

The processor is also operable (for example under suitable software instruction) as a timestamp unit adapted to periodically add a timestamp to the recorded video, thereby enabling synchronisation of a plurality of videos recorded by a plurality of portable video recording devices when generating free viewpoint content, the timestamp unit being adapted to generate timestamps responsive to the detected wireless synchronisation signal, for example as described previously herein.

A memory 1330 may be used to store video images, for subsequent transmission to a data processing apparatus such as that shown in FIG. 11 for the purposes of generating free viewpoint content. Alternatively or in addition the memory may be used as a buffer for temporarily storing video that is awaiting the application of a timestamp, and/or as a buffer for streaming video to and apparatus such as that shown in FIG. 11 during live or near real-time acquisition of video for the generation of free viewpoint content.

As noted previously herein for example with reference to FIG. 2, the generation of free viewpoint content uses multiple cameras. Hence in an embodiment of the present invention, a free viewpoint content capture system comprises a plurality of portable video recording devices as described herein.

Typically, such a free viewpoint content capture system also comprises at least one wireless synchronisation signal source from which the plurality of portable video recording devices can extract a synchronisation signal for the purposes of generating a video timestamp.

Similarly, such a free viewpoint content capture system typically also comprises at least one data processing apparatus (such as that shown in FIG. 11) operable to generate free viewpoint content data based upon video data from two or more of the plurality of portable video recording devices.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of capturing free viewpoint content at a location, comprising the steps of:
   recording video on each of a plurality of portable video recording devices at the location;
   each portable video recording device detecting a wireless synchronisation signal transmitted at the location; and
   each portable video recording device periodically adding a timestamp to its respective recorded video;
   wherein the timestamp is responsive to the detected wireless synchronisation signal, thereby enabling synchronisation of a plurality of recorded videos responsive to the timestamps,
   wherein one or more of the portable recording devices transmitting the detected wireless synchronisation signal, and
   wherein the one or more of the portable recording devices re-transmits the detected wireless synchronisation signal so that others of the portable recording devices may detect the synchronisation signal.

2. The method of claim 1, in which the wireless synchronisation signal is transmitted by one or more infrared transmitters.

3. The method of claim 2, in which the or each infrared transmitter is in a predetermined position at the location.

4. The method of claim 1, in which the wireless synchronisation signal is transmitted by a wireless radio service.

5. The method of claim 4, in which the wireless synchronisation signal is transmitted in a wireless radio beacon.

6. The method of claim 1, the wireless synchronisation signal is an audio signal.

7. The method of claim 6, in which the audio signal emanates from a source at a predetermined position at the location.

8. The method of claim 7, in which each portable video recording device corrects for audio propagation time from the predetermined position of the source to the respective portable video recording device.

9. The method of claim 8, in which each portable video recording device corrects for audio propagation time from the predetermined position of the source to the respective portable video recording device based upon analysis of one or more features in the video being recorded by the respective video recording device.

10. The method of claim 8, in which each portable video recording device corrects for audio propagation time from the predetermined position of the source to the respective portable video recording device based upon a wireless signal transmitted by a wireless radio service.

11. A non-transitory, computer readable storage medium containing a computer program comprising computer executable instructions, which when executed by a computer system, cause the computer system to capture free viewpoint content at a location by carrying out actions, comprising:
   recording video on each of a plurality of portable video recording devices at the location;
   each portable video recording device detecting a wireless synchronisation signal transmitted at the location; and
   each portable video recording device periodically adding a timestamp to its respective recorded video;
   wherein the timestamp is responsive to the detected wireless synchronisation signal, thereby enabling synchronisation of a plurality of recorded videos responsive to the timestamps,
   wherein one or more of the portable recording devices transmitting the detected wireless synchronisation signal, and
   wherein the one or more of the portable recording devices re-transmits the detected wireless synchronisation signal so that others of the portable recording devices may detect the synchronisation signal.

12. A portable video recording device adapted to capture video contributing to free viewpoint content, the portable video recording device comprising:
   a video recording unit operable to record video images at a location occupied by the portable video recording device;
   a detector adapted to detect a wireless synchronisation signal transmitted at the location; and
   a timestamp unit adapted to periodically add a timestamp to the recorded video, thereby enabling synchronisation of a plurality of videos recorded by a plurality of portable video recording devices when generating free viewpoint content;
   wherein the timestamp unit is adapted to generate timestamps responsive to the detected wireless synchronisation signal,
   wherein the portable recording device re-transmits the detected wireless synchronisation signal, and
   wherein the one or more of the portable recording devices re-transmits the detected wireless synchronisation signal so that others of the portable recording devices may detect the synchronisation signal.

13. The portable video recording device of claim 12, wherein the portable video recording device is a mobile phone.

14. A free viewpoint content capture system, comprising a plurality of portable video recording devices, each of the portable video recording devices being adapted to capture video contributing to free viewpoint content and each of the portable video recording devices comprising:
   a video recording unit operable to record video images at a location occupied by the portable video recording device;
   a detector adapted to detect a wireless synchronisation signal transmitted at the location; and
   a timestamp unit adapted to periodically add a timestamp to the recorded video, thereby enabling synchronisation of a plurality of videos recorded by a plurality of portable video recording devices when generating free viewpoint content;
   wherein the timestamp unit is adapted to generate timestamps responsive to the detected wireless synchronisation signal,
   wherein one or more of the portable recording devices transmits the detected wireless synchronisation signal, and
   wherein the one or more of the portable recording devices re-transmits the detected wireless synchronisation signal so that others of the portable recording devices may detect the synchronisation signal.

15. The free viewpoint content capture system according to claim 14, comprising:
   a data processing apparatus operable to generate free viewpoint content data based upon video data from two or more of the plurality of portable video recording devices.

* * * * *